Jan. 28, 1936.  C. O. ROWE  2,028,924

PENCIL SHARPENER

Filed June 4, 1935

INVENTOR,
Claude O. Rowe.
BY David E. Lain,
ATTORNEY

Patented Jan. 28, 1936

2,028,924

UNITED STATES PATENT OFFICE 2,028,924

PENCIL SHARPENER

Claude O. Rowe, Santa Monica, Calif., assignor of one-half to Wright Fillmore and Lil A. Johnson, both of Los Angeles, Calif.

Application June 4, 1935, Serial No. 24,869

3 Claims. (Cl. 120—93)

My invention relates to improvements in pencil sharpeners, and has for an object to provide a pencil sharpener consisting of a relatively large and heavy wheel mounted for revolution, in the axis of which are fastened the sharpening knives, and the operative revolutions of which require but the light pulling touches of the finger tips on the wheel's periphery to sharpen any pencil contacting with the knives.

Another object of my improvement is to place two sets of oppositely disposed sharpening knives within the wheel to provide for sharpening a pencil extended into the wheel from either side thereof by relatively opposite revolutions of the wheel.

Another object of my improvement is to provide an open-top box, preferably of molded glass, in which are open-top bearings for mounting the said wheel with the upper part thereof extended above the box.

Another object of my improvement is to design my device suitably for use as a paper weight thereby providing it for additional usefulness on a writing table.

Other objects of my improvement will appear as the description proceeds.

Figure 1:
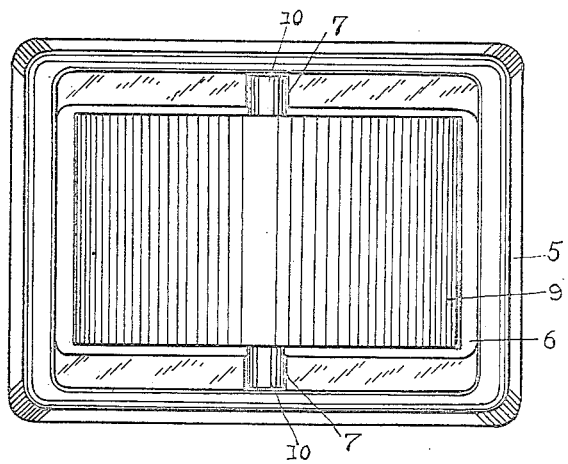
Figure 2:
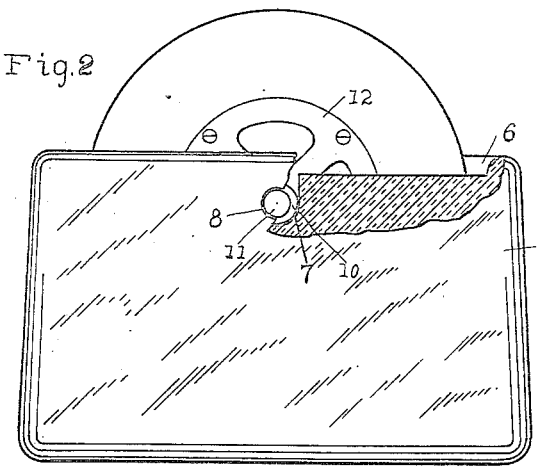
Figure 3:
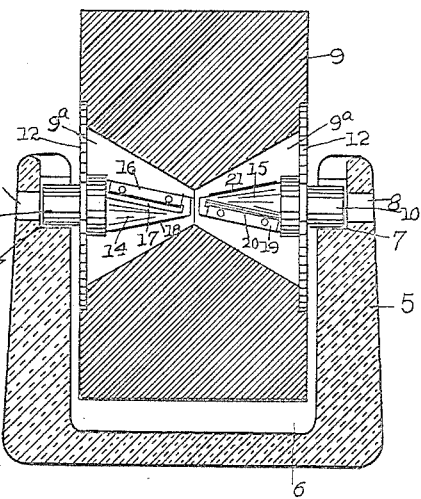
Figure 4:
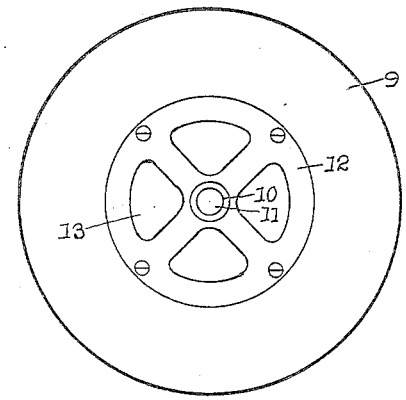

I attain these and other objects of my improvement with the mechanism illustrated in the accompanying sheet of drawing, forming a part of this specification, in which Figure 1 is a plan view of my pencil sharpener, Fig. 2 is a side elevation of Fig. 1, Fig. 3 is an end view of Fig. 2 in section on a medial vertical plane, and Fig. 4 is a side elevation of the wheel shown by itself.

Similar characters refer to similar parts throughout. Certain parts are broken away to show other parts hidden thereby.

With more particular reference to designated parts: The glass box 5 has the chamber 6 and the two aligned open-top bearings 7, 7; also there are two aligned holes 8, 8 through the side walls of the box in the axis of the bearings 7, 7.

The wheel 9 is relatively large and heavy, preferably of bronze and has the central opening 9ª of smallest diameter at the center of the wheel and flaring widely toward the sides thereof. On each side of the wheel is fastened the gudgeon 10 having the flange 12 which is attached to the wheel to dispose the axis of the gudgeon in the wheel axis. The gudgeon has the longitudinal central hole 11 therethrough and the flange has the openings 13 therein.

On the interior of each of the flanges is fastened a pencil sharpening device of usual construction. That on the front flange 12 has the hollow conical body 14 while the one on the rear flange 12 has the hollow conical body 15. The conical body 14 has two longitudinal shavings slots 17, only one of which is shown and two sharpening knives 16 and 18. The conical body 15 has two longitudinal shavings slots 20, only one of which is shown, and two sharpening knives 19 and 21 fastened thereon.

The two point formers 14 and 15 are alike, but are relatively oppositely disposed within the wheel and require relatively opposite revolutions of the wheel to operate as sharpeners.

To operate: Place the end of a pencil in the front opening 8 and revolve the wheel 9 clockwise while forcing the pencil end against the knives 16, 18. Because of the superabundant weight of the wheel and its easy movement in the glass bearings 7, 7, the pencil is quickly sharpened with little apparent effort required to revolve the wheel.

Then extend a pencil end into the rear opening 8 and revolve the wheel 9 counterclockwise while forcing the pencil against the knives 19, 21 and the pencil is quickly sharpened as before.

The shavings cut from the pencils by the said sharpening knives fall into the flaring openings 9ª and, as the wheel revolves, are carried out of the wheel through the flange openings 13 and fall into the bottom of the box chamber 6, from where they may be removed by first taking the wheel out of the box.

The wheel is caused to revolve, preferably, by placing the finger tips on its periphery and gently pulling them in the desired direction of revolution.

It may be noticed that both sides of the box are alike, and both sides of the wheel are alike. A pencil may be extended into that opening 8 which may be nearest and clockwise revolution of the wheel will sharpen the pencil.

Having thus disclosed my invention, what I claim as new therein and desire to secure by Letters Patent is,—

1. A pencil sharpener including, a relatively large and heavy wheel, mounted for revolution in bearings, having a central opening therethrough, and pencil-sharpening means fastened in the said central opening disposed for sharpening any pencil extended and retained therein by revolving the said wheel.

2. A pencil sharpener including, a wheel having a flaring central opening therethrough, hollow flanged gudgeons fastened in a line on each end of the wheel the flanges thereof having openings therethrough, pencil sharpening means centrally disposed within the said central wheel opening, and means for mounting the wheel in bearings on the said gudgeons for revolution.

3. A pencil sharpener including, a wheel having a central opening therethrough flaring outwardly from the center of the wheel, a hollow gudgeon on each end of the wheel, aligned, having a flange with openings therethrough fastened over the outer end of the flaring opening, a pencil sharpening device fastened to each of the said flanges disposed within the wheel aligned with the said gudgeon openings, and a box having uncovered bearings therein for mounting the said wheel gudgeons therein to dispose the upper part of the wheel outside of the box, the said box sides having openings therethrough aligned with the said bearings, with the said hollow gudgeons when in the bearings and with the said pencil sharpening devices.

CLAUDE O. ROWE.